Aug. 21, 1923.
V. A. DAVISON
1,465,780
AUTOMOBILE BUMPER
Filed Dec. 26, 1922
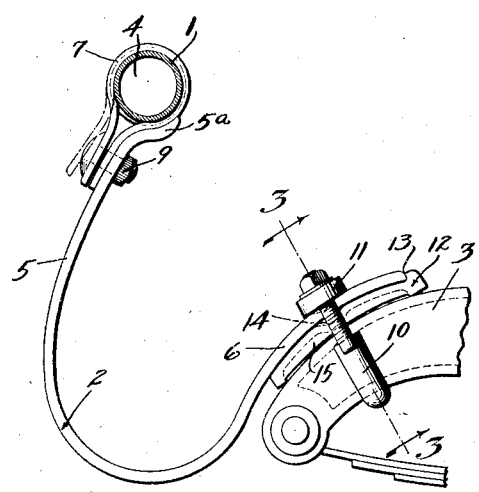
Fig.1    Fig.6    Fig.7
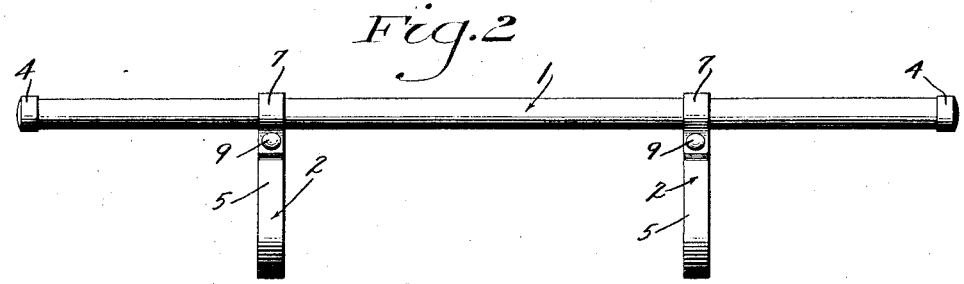
Fig.2
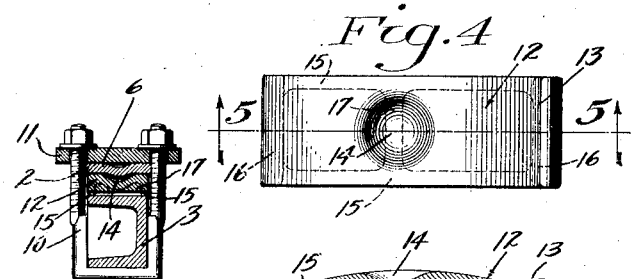
Fig.3    Fig.4
Fig.5
Inventor
Vergil A. Davison
By Wordo Work
Attorneys Patented Aug. 21, 1923.

1,465,780

UNITED STATES PATENT OFFICE.

VERGIL A. DAVISON, OF DETROIT, MICHIGAN, ASSIGNOR TO THE CINCINNATI BALL CRANK COMPANY, OF CINCINNATI, OHIO, A CORPORATION OF OHIO.

AUTOMOBILE BUMPER.

Application filed December 26, 1922. Serial No. 608,881.

*To all whom it may concern:*

Be it known that I, VERGIL A. DAVISON, a citizen of the United States, and residing at Detroit, in the county of Wayne and State of Michigan, have invented new and useful Improvements in Automobile Bumpers, of which the following specification is a full disclosure.

This invention relates to improvements in automobile bumpers, and more particularly to bumpers of that type which may be characterized by the utilization of a relatively non-yieldable impact member or bar mounted upon the free ends of a pair of resilient supporting arms respectively securely clamped to the ends of the longitudinal frame members of an automobile, either the front or rear end service.

The object of the invention is to provide a construction for a bumper which combines strength and adequate protection with simplicity of structure and mode of attachment.

A preferred construction embodying the invention is disclosed in the accompanying drawings, in which:

Figure 1 is a side elevation of one of the resilient arms for supporting the non-yielding impact bar, as applied to the end of one of the automobile longitudinal frame members with the impact bar shown in cross section.

Figure 2 is a front elevation of the bumper.

Figure 3 is a section on line 3—3 Fig. 1.

Figure 4 is an enlarged top plan view of a shoe plate interposed between the end of the resilient arm and automobile frame.

Figure 5 is a section on line 5—5, Fig. 4.

Figures 6 and 7 are respectively front and side views of a modified form of resilient arm.

The bumper comprises in general a non-yieldable impact member 1, in the form of a round bar or tube, preferably straight throughout its length, two supporting members 2—2 of gooseneck shape of resilient steel bar stock, secured at their forward ends to the bar at points spaced inwardly from the ends thereof, and their inner ends adapted for clamping flatwise to the longitudinal frame members 3—3 of the automobile.

Considering the parts of the bumper more in detail, the impact member or bar 1 is of a length sufficient to extend the full width of the automobile of average size, and of suitable character and strength to withstand the force of impact (within reasonable limits) in the event of collision with other vehicles or obstacles. The ends of the bar are suitably finished, preferably by the mounting of spherical or cylindrical caps 4—4.

The supporting members 2—2 are preferably bars of flat bar stock bent primarily in U-shape in order to impart thereto the requisite resilient or yieldable qualities, and applied in such a manner that the arms extend upwardly. Although generally U-shaped, each supporting member 2 is somewhat irregular in conformation, as shown in Fig. 1, the outermost portion or limb 5 being somewhat longer than the innermost portion or limb 6, and curving slightly rearwardly from the vertical. The end of the limb 5, in the form shown in Figs. 6 and 7, is bent forwardly and downwardly in the form of a loop 7 surrounding the impact bar 1, the end 8 of the loop being brought parallel with and flatwise toward the limb at the base of the loop. This provides a split ring shackle clip integral upon the end of the arm to receive and frictionally clamp the impact bar for securely uniting the parts, this end formation developing the structure into gooseneck shape or configuration. The loop portion is of reduced metal thickness facilitating in forming the loop, increasing the resiliency of the loop, and also decreases the weight of the arm structure as a unit.

In the form shown in Fig. 1 the clip 7 forms a separate element from the arm and is secured to the limb 5 by a bolt 9 which compresses the clip for frictionally clamping the impact bar. The end of the limb 5 is slightly curved, as at 5ª, to conform to the shape of the underside of the loop and provide a seat for the loop. This type of structure being preferable as offering increased strength and presents facilities in production. The arrangement, though a simple one, permits the lateral adjustment of the arms along the bar, a feature that makes the bumper attachable to different makes of automobiles, and particularly those that differ in width between the frame members.

The rearmost and shorter portion or limb 6 of each supporting member extends rearwardly and upwardly at an angle of substantially 45°, its end portion being fashioned with a slight degree of reverse curvature, conforming to the curvature of the frame member 3 throughout its extreme end portion. The limb 6 lies flatwise along the upper face of a shoe plate 12 engaged upon the frame member 3, and the part clamped thereto by means of a U-bolt 10 stradling the frame member, its screw threaded ends being anchored in a transverse bar 11 bearing against the top surface of the arm 6 of the support member 2.

As clearly shown in Fig. 1, the shaping of the supporting members 2—2 determines the position of the impact bar 1 relative to the points of attachment, as well as the vital parts of the automobile; namely, at a distance forwardly and above the forward ends of the frame members, the central longitudinal axis of the impact bar substantially intersecting the perpendicular to a line tangent to the curved plane of contact between the supporting members and the frame members at the point of connection of the U-bolt 10.

This relative position of the impact bar, the conformation of the supporting members and their mode of attachment to the frame members, influences, in a large degree, the manner in which a blow received by the impact member is resisted and absorbed. It is conceived that the force of a blow directed horizontally against the bar would primarily be taken up by the resiliency of the arms, with a minor portion transmitted as a direct thrust to the frame members. A severe blow however would tend to flex the spring structure about the U-bolt connection upon the frame members and the force of the blow deflected either upwardly or downwardly. In other words, the tendency under a very severe impact would be to roll the arms rearwardly, along the frame members, and bending the same at the points of connection before the bar would come in contact with the radiator or lamps, or the full force transmitted to the frame members.

In short, the bumper is capable of undergoing a considerable degree of distortion even to the point of destruction, before the force of impact is delivered with damaging effect to the vital parts of the automobile, or its full effect transmitted to the frame thereof.

The shoe plate 12 has its upward side curved conforming to the shape of the limb 6 of the supporting member or arm, with the end of the limb engaging an abutment 13 as a cross rib or flange on one end of the shoe plate. The upper side of the plate has a central recess 14 formed therein to receive a protuberance on the lower side of the limb 6 for binding the parts against longitudinal displacement one upon the other. The lower side of the shoe plate is recessed providing longitudinal and cross marginal ribs or flange 15—16 respectively and a central flange 17, the recesses providing a clearance for rivet or bolt heads extending from the upper side of the automobile frame 3. The cross ribs 16 provide edges for a gripping engagement with the surface of the frame 3 for more rigidly securing the parts together.

Having described my invention, I claim:

1. An automobile bumper, comprising a transverse impact bar, and supporting members consisting of resilient bars of substantially U-shape, having one end portion bearing flatwise against the automobile frame members, an intermediate portion curving forwardly below the end of said frame member, and a substantially longer outer end portion extending upwardly above and forwardly beyond the frame member and terminating with a resilient loop for receiving and frictionally clamping the impact bar.

2. An automobile bumper, comprising an impact bar and resilient bars for attaching said impact bar to the autotmobile frame members, each bent to provide an end portion to be clamped in flatwise contact along the upper surface of the end of one of said frame members, thence downwardly below and forward beyond the end of said frame member, and thence upwardly with slight rearward curvature to form the forward end portion terminating a substantial distance above and forwardly of the ends of the frame member in a loop surrounding said impact bar.

3. An automobile bumper, comprising an impact bar adapted to be mounted transversely in front of an automobile, and supporting members therefor, consisting of resilient bars, each bent to provide an inner end portion adapted to be clamped flatwise along the upper face of the automobile frame member, an intermediate U-shaped portion extending below the end of said frame member, and a substantially vertical forward portion terminating a substantial distance above said frame member in looped ends surrounding said impact bar, said outer portions constituting vertical impact surfaces disposed forwardly of said impact bar.

4. An automobile bumper, comprising an impact bar adapted to extend transversely in front of an automobile, and a pair of resilient attaching bars each bent to form an inner end portion adapted to be clamped flatwise to the end portion of an automobile frame member, an intermediate U-shaped portion below said frame member, and an outer end portion extending upwardly with a slight rearward curvature above said frame member, and looped at its end around said impact member, said outer portions forming vertical impact surfaces lying substantially in the plane of the impact face of said impact member.

5. An autotmobile bumper, comprising a pair of resilient flat bars of approximately gooseneck shape, each having one end portion bearing flatwise against an automobile frame member and an opposite resilient split loop end to encircle an impact bar engaged through the loop, means engaged through the bar for compressing the loop for frictionally clamping the impact bar, and an impact bar engaged through the looped ends of said bars.

6. An automobile bumper, comprising a transverse impact bar, supporting members therefor each consisting of a resilient flat bar of approximately U-shape having a butt end and an opposite end of loop form for engagement about the impact bar and adapted to frictionally clamp the impact bar, a shoe plate providing an end abutment and seat for the butt end of said resilient bar for securing the bar to an automobile frame.

In witness whereof, I hereunto subscribe my name, as attested by the two subscribing witnesses.

VERGIL A. DAVISON.

Witnesses:
RALPH F. MILLER,
R. H. WOOD.